United States Patent
Tarver et al.

(10) Patent No.: US 7,160,642 B2
(45) Date of Patent: Jan. 9, 2007

(54) FUEL CELL STACK ASSEMBLY AND METHOD OF FABRICATION

(75) Inventors: Gary D Tarver, Corvallis, OR (US); Daniel A Kearl, Philomath, OR (US); Richard B. Peterson, Corvallis, OR (US); John Gilman, Corvallis, OR (US); Scott Barnett, Evanston, IL (US); Scott L. Swartz, Columbus, OH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 440 days.

(21) Appl. No.: 10/699,395

(22) Filed: Oct. 30, 2003

(65) Prior Publication Data

US 2005/0095491 A1  May 5, 2005

(51) Int. Cl.
*H01M 2/08* (2006.01)
*H01M 2/14* (2006.01)

(52) U.S. Cl. ............... 429/35; 429/38; 429/39
(58) Field of Classification Search ........... 429/32, 429/34, 12, 35, 38, 39
See application file for complete search history.

(56) References Cited

U.S. PATENT DOCUMENTS

| | | | |
|---|---|---|---|
| 4,910,100 A * | 3/1990 | Nakanishi et al. | 429/32 |
| 5,175,063 A * | 12/1992 | Ishihara et al. | 429/32 |
| 6,200,698 B1 | 3/2001 | Carlstrom, Jr. | |
| 6,465,119 B1 | 10/2002 | Koripella et al. | |
| 6,479,178 B1 | 11/2002 | Barnett | |

* cited by examiner

*Primary Examiner*—Patrick Joseph Ryan
*Assistant Examiner*—Thomas H. Parsons (57) ABSTRACT

A fuel cell assembly includes a plurality of opposing fuel cell stacks. Each of the fuel stacks has a plurality of fuel cells in which each fuel cell has an anode, a cathode, and an electrolyte. The fuel cell assembly further includes a spacing member disposed between the fuel cell stacks thereby defining a fluidic cavity.

45 Claims, 6 Drawing Sheets

FUEL CELL STACK ASSEMBLY AND METHOD OF FABRICATION

BACKGROUND

During the past several years, the popularity and viability of fuel cells for producing both large and small amounts of electricity has increased significantly. Fuel cells conduct an electrochemical reaction with reactants such as hydrogen and oxygen to produce electricity and heat. Fuel cells are similar to batteries except they can be "recharged" while providing power. In addition, fuel cells are much cleaner than other sources of power, such as devices that combust hydrocarbons.

Fuel cells provide a DC (direct current) voltage that may be used to power motors, lights, computers, or any number of electrical appliances. A typical fuel cell includes an electrolyte disposed between an anode and a cathode. There are several different types of fuel cells, each using a different chemistry. Fuel cells are usually classified by the type of electrolyte used into one of five groups: proton exchange membrane (PEM) fuel cells, alkaline fuel cells (AFC), phosphoric-acid fuel cells (PAFC), solid oxide fuel cells (SOFC), and molten carbonate fuel cells (MCFC).

While all fuel cells have some desirable features, solid oxide fuel cells (SOFC) have a number of distinct advantages over other fuel cell types. Some advantages of SOFCs include reduced problems with electrolyte management, increased efficiencies over other fuel cell types (SOFCs are up to 60% efficient), higher tolerance to fuel impurities, and the possible use of internal reforming or direct utilization of hydrocarbon fuels.

Most SOFCs include an electrolyte made of a solid-state material such as a fast oxygen ion conducting ceramic surrounded on each side by an electrode: an anode on one side, and a cathode on the other. In order to provide adequate ionic conductivity in the electrolyte, SOFCs typically operate in the 500 to 1000° C. range. An oxidant such as air is fed to the cathode, which supplies oxygen ions to the electrolyte. Similarly, a fuel such as hydrogen is fed to the anode where it is transported to the electrolyte to react with the oxygen ions. This reaction produces electrons, which are then introduced into an external circuit as useful power.

In order to produce a useable amount of power and to increase efficiency, SOFC fuel cells are typically stacked on top of one another to form an SOFC stack. In many such designs, a fuel manifold is sealed around the perimeter of the stack to assure that the fuel and air are separated and directed to their proper locations respectively. Sealing around the entire perimeter requires a long seal length between dissimilar materials.

The difference in material composition between the metal fuel manifolds and the ceramic SOFCs results in different coefficients of thermal expansions. Throughout the operation of an SOFC, a cell is often cycled between room temperature and a full operating temperature a number of times. This thermal cycle causes the housing materials to contract and expand according to their varying coefficients of thermal expansion. This expansion and contraction introduces thermal stresses that may be transferred through the seals and other structural components directly to the ceramic cell. These thermal stresses effectively reduce the service life of an SOFC by compromising the seals or breaking the structurally brittle ceramic cells.

Moreover, typical fuel cell stack arrangements have low volumetric power density due to geometric limitations. Volumetric power density is a measure of the power produced by a fuel cell in relation to its volume. Low volumetric power density may undermine the broad applicability of fuel cell systems due to size considerations.

SUMMARY

A fuel cell assembly includes a plurality of fuel cell stacks. Each of the fuel cell stacks has a plurality of fuel cells in which each fuel cell has an anode, a cathode, and an electrolyte. The fuel cell assembly further includes a spacing member disposed between the fuel cell stacks thereby defining a fluidic cavity, and a manifold coupled to the fluidic cavity.

BRIEF DESCRIPTION OF THE DRAWINGS

The accompanying drawings illustrate various embodiments of the present apparatus and method and are a part of the specification. The illustrated embodiments are merely examples of the present apparatus and method and do not limit the scope of the disclosure.

Throughout the drawings, identical reference numbers designate similar, but not necessarily identical, elements.

DETAILED DESCRIPTION

The present specification describes a fuel cell assembly that includes a plurality of opposing fuel cell stacks. Each of the fuel cell stacks has a plurality of fuel cells in which each fuel cell has an anode, a cathode, and an electrolyte. The fuel cell assembly further includes a spacing member disposed between the fuel cell stacks thereby defining a fluidic cavity, and a manifold coupled to the fluidic cavity.

In the following description, for purposes of explanation, numerous specific details are set forth in order to provide a thorough understanding of the present method and apparatus. It will be apparent, however, to one skilled in the art that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

Figure 1:
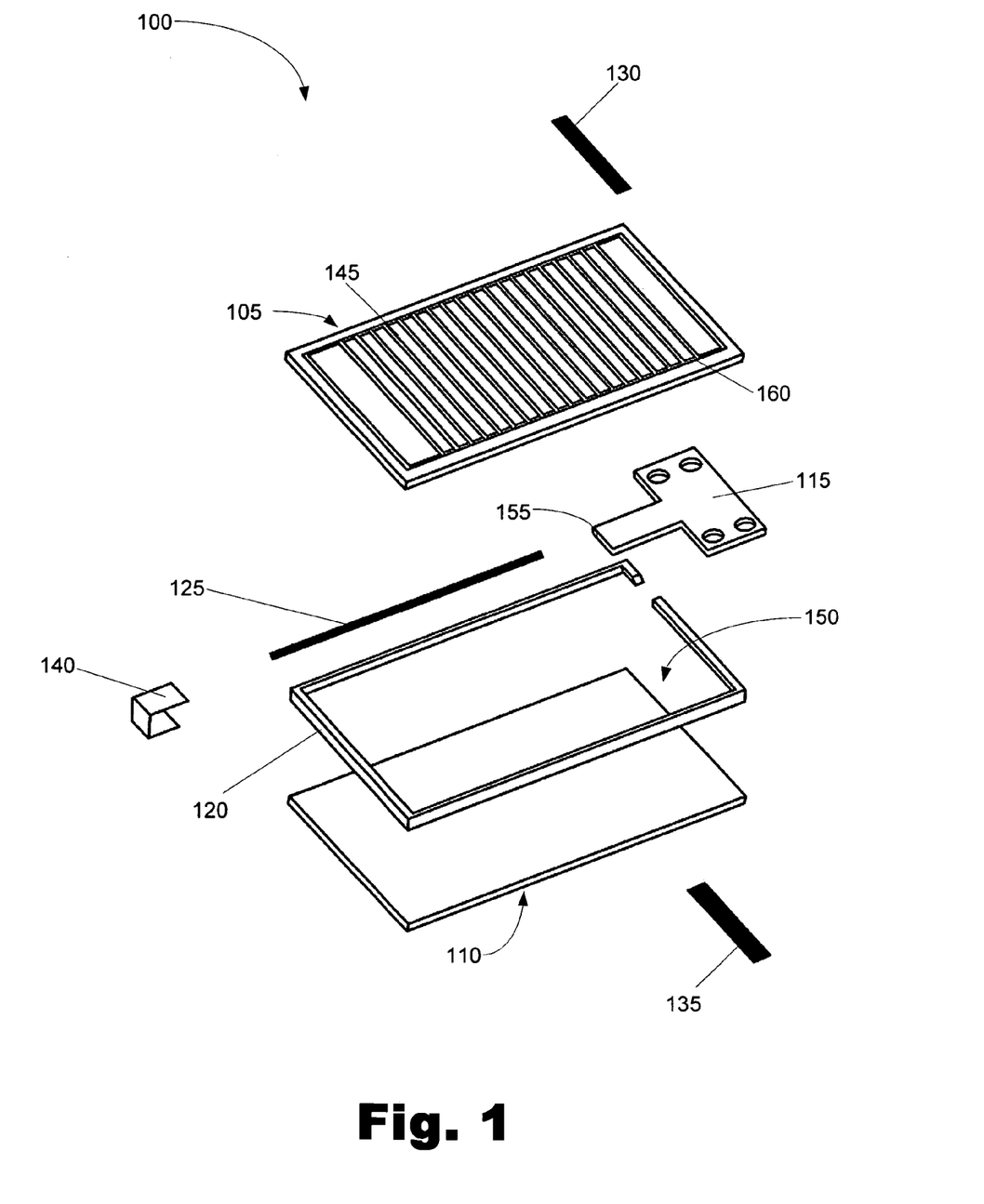
FIG. 1 illustrates an exploded view of a fuel cell stack assembly according to one exemplary embodiment.

As shown in FIG. 1, an exemplary fuel cell stack assembly (100) generally includes an upper integrated planar array fuel cell stack (105), a lower integrated planar array fuel cell stack (110), a fuel manifold (115), a spacing member (120), a fuel needle (125), a top external electrical interconnection (130), a bottom external electrical interconnection (135) and an end electrical interconnection (140) between the two stacks (105, 110). The upper fuel cell stack (105) and the lower fuel cell stack (110) each include a plurality of individual fuel cells (145) formed on the fuel cell stack (105, 110) porous substrate. The spacing member (120) maintains the stacks at a pre-determined distance from each other and a glass or ceramic adhesive seals the fuel cell stacks (105, 110). Accordingly, the spacing member (120) and the fuel cell stacks (105, 110) form a sealed fluidic cavity (150). The fuel manifold (115) may be fluidly coupled to the fluidic cavity (150) by the fuel needle (125).

The fuel cell stacks (105, 110) shown in FIG. 1 are fabricated on top of a porous ceramic substrate and may be formed of integrated planar arrays of individual fuel cells. Accordingly, the fuel cells may be formed on a plate shaped ceramic substrate in order to form planar arrays of individual fuel cells. In addition, the spacing member (120) separating the fuel cell stacks (105, 110) is formed of a material having a coefficient of thermal expansion similar to that of the ceramic material used to form the fuel cell stacks (105, 110).

The fuel cell stacks (105, 110) may only be coupled to the fuel manifold (115) at one end of the fuel cell stack assembly (100). The result may be a fuel manifold coupled to a first end of the assembly, whereby the fuel cell stacks cantilever from the manifold. Such a configuration minimizes the seal length between dissimilar materials such as the metallic materials of the manifold (115) and the ceramic materials of the fuel cell stacks (105, 110). This minimization of the seal length reduces the stresses induced into the present system due to different coefficients of thermal expansion during the temperature cycling that accompanies fuel cell operation. The single connection point allows the fuel cell stack assembly (110) to expand or contract unconstrained as a cantilever structure.

This freedom of expansion results in a reduction of cracking of the fuel cell stacks (105, 110) and/or the spacing member (120) seal, thereby improving the longevity of the fuel cell stack assembly. Accordingly, the fuel cell stacks (105, 110) may include a higher number of individual fuel cells (145; FIG. 1) due to the reduced risk of cracking the fuel cells or the seals during thermal expansion. This ability to incorporate a higher number of fuel cells, in turn, leads to higher volumetric power density, higher stack voltages, and correspondingly lower stack electrical parasitic losses.

The fuel manifold (115) illustrated in FIG. 1 is configured to introduce fuel into fluidic cavity (150) by way of a fuel needle (125). Fuel entering through the manifold (115) is distributed through the needle (125) along the length of the fluidic cavity (150). One embodiment of the needle (125) may be a hollow tube or pipe with an exhaust hole at its end for releasing fuel from the manifold (125) into the fluidic cavity (150). A majority of the released fuel is then consumed from the fluidic cavity (150) by the fuel cell stacks (105, 110).

After the fuel is consumed and the chemical reaction results, excess fuel and waste product are exhausted from the fluidic cavity (150) by way of exhaust holes (155) in the fuel manifold. Thus, a single manifold (115) having a single fuel needle (125) may adequately supply fuel to two or more fuel cell stacks (105, 110) and dispose of excess fuel and reactants. In addition, the fuel is contained within the cavity (150), thereby reducing the possibility of creating a volatile fuel mixture outside of the cavity (150).

The internal electrical interconnects (160) shown in FIG. 1 facilitate efficient current withdrawal from the fuel cell stack assembly (100). Each of the individual fuel cells (145) are electrically coupled with adjacent fuel cells in the fuel cell stacks (105, 110) by way of the internal electrical interconnects (160). The internal electrical interconnects (160) are, in turn, coupled to the external interconnections (130, 135) and the end electrical interconnection (140) which electrically connects multiple stacks in series. The external interconnections may then, in turn, be coupled to an external current consuming device (not shown) for which the fuel cell assembly is providing power.

The internal electrical interconnects (160) illustrated in FIG. 1 may be formed using conductive metal, ceramic, or cermet interconnection strips that are imbedded in the thin film deposition of the anode/electrolyte/cathode system. The use of internal electrical interconnects reduces the number of external electrical interconnections associated with the fuel cell. Such a configuration provides for a higher net stack operating voltage and correspondingly lower stack current, which in turn results in lower electrical parasitic losses for the stack, higher efficiencies, and more efficient manufacturing. Additionally, the conductive metal, ceramic, or cermet-interconnected strips may be thin, thereby reducing the parasitic losses between the anode and the cathode, producing higher overall efficiencies.

Figure 2:
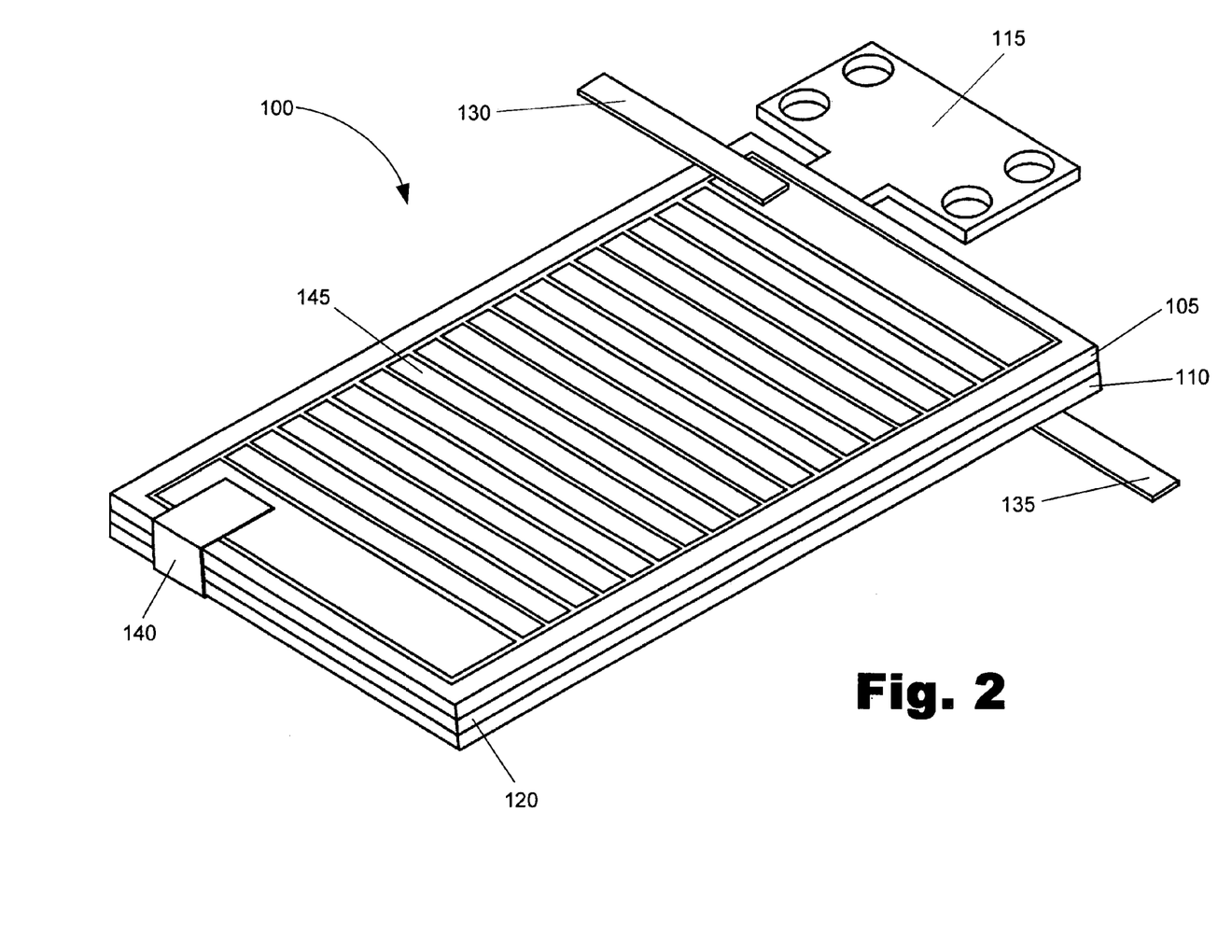
FIG. 2 illustrates an assembled view of a fuel cell stack assembly according to one exemplary embodiment.

FIG. 2 illustrates an assembled view of the fuel cell stack assembly (100). As shown in FIG. 2, the fuel cell stacks (105, 110) are sealed with the spacing member (120) there between. The fuel manifold (115) extends through an opening in the spacing member (120) to provide fuel to the interior fluidic cavity between the fuel cell stacks (105, 110). As fuel is consumed and electrical power is produced by the fuel cell stack assembly (100), electrical current flows through the electrical interconnections (130, 135,140) due to the reaction described above.

As seen in FIG. 2, the present fuel cell stack assembly has a compact design in which a plurality of fuel cell stacks (105, 110) are assembled so as to share a fuel manifold (115) or other fluidic manifold. As discussed below, such a configuration may provide for increased volumetric power density.

Exemplary Implementation and Operation

Figure 3:
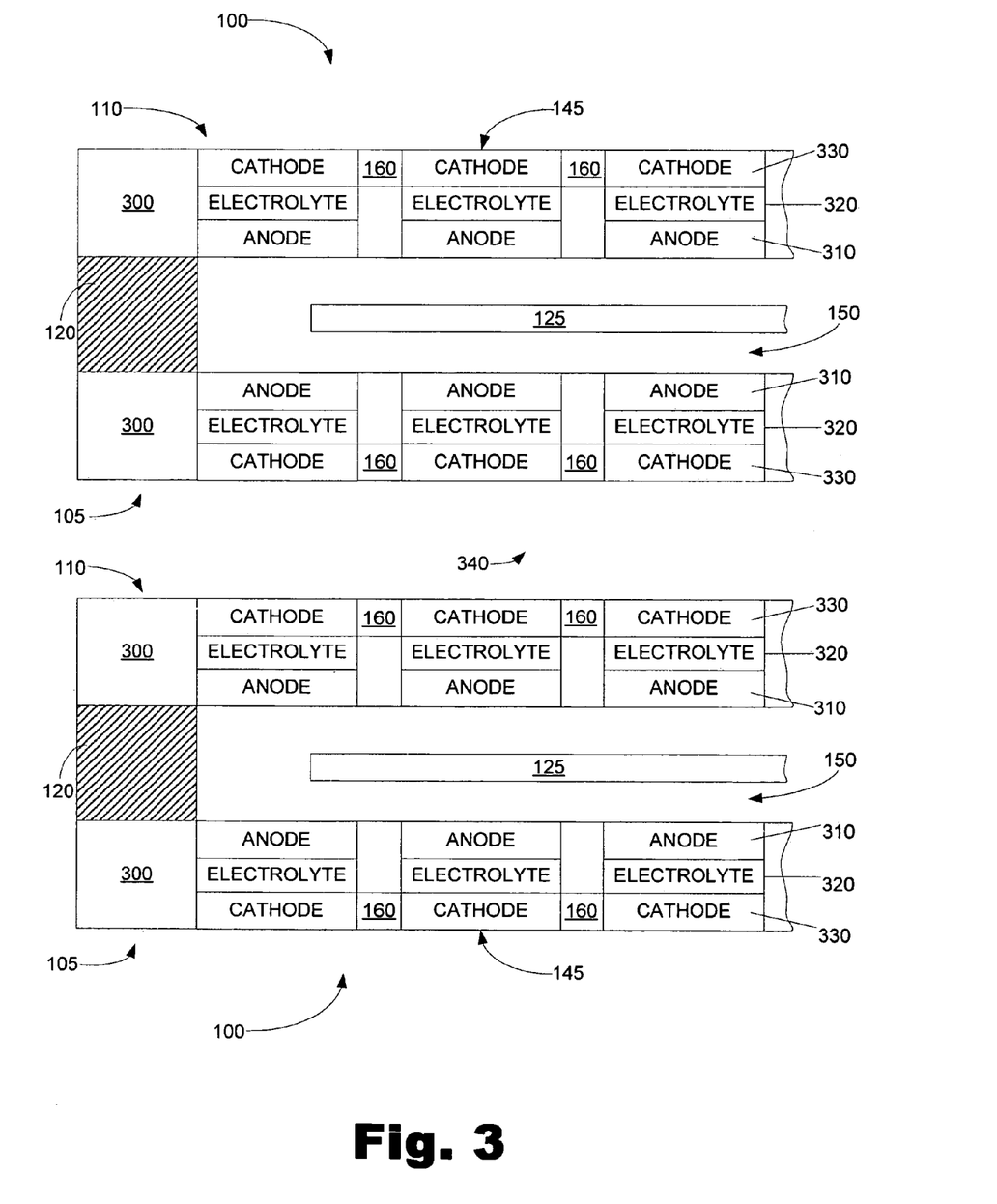
FIG. 3 illustrates a cross-sectional view of two adjacent fuel cell assembly stacks according to one exemplary embodiment.

FIG. 3 illustrates partial cross sectional views of two adjacent fuel cell stack assemblies (100). In each fuel cell stack assembly (100), a fuel cell needle (125) conveys fuel from the fuel manifold (115; FIG. 1) to the fluidic cavity (150) where it is used by the multiple fuel cells (145).

Each fuel cell stack (105, 110) includes multiple individual fuel cells (145) formed on a porous ceramic fuel cell stack substrate (300). Each individual fuel cell (145) includes an anode (310), an electrolyte (320), and a cathode (330). The electrolyte (320), located between the anode (310) and the cathode (330) conducts oxygen ions from air on the cathode side of the fuel cell stack (105, 110) to the anode side where those ions react with the fuel from the fluidic cavity (150).

Upon reacting with the fuel, both water and electricity are produced. The electricity that is produced may then be transferred from the internal electrical interconnects (160) to an external circuit (not shown) by way of the external electrical interconnections (130, 135; FIG. 1). As illustrated in FIG. 3, each fuel cell stack assembly (100) may be connected to, and provide power for, an electronic device.

In the illustrated implementation, two fuel cell stack assemblies (100) are stacked together. Each assembly includes two fuel cell stacks (105, 110) for a total, in the configuration of FIG. 3, of four fuel cell stacks. However, any number of fuel cell stacks may be used according to the present system and method.

FIG. 3 illustrates an external oxidant space (340) formed between adjacent fuel cell assembly stacks (100). According to the configuration of FIG. 3, a single oxidant stream may supply an oxidant to two fuel cell stacks (105, 110). This configuration allows the fuel cell stack assemblies (100) to be closely grouped. This close grouping further facilitates high volumetric power density and allows several fuel cell stack assemblies (100) to be grouped together to meet the power needs of a particular system.

Figure 4:
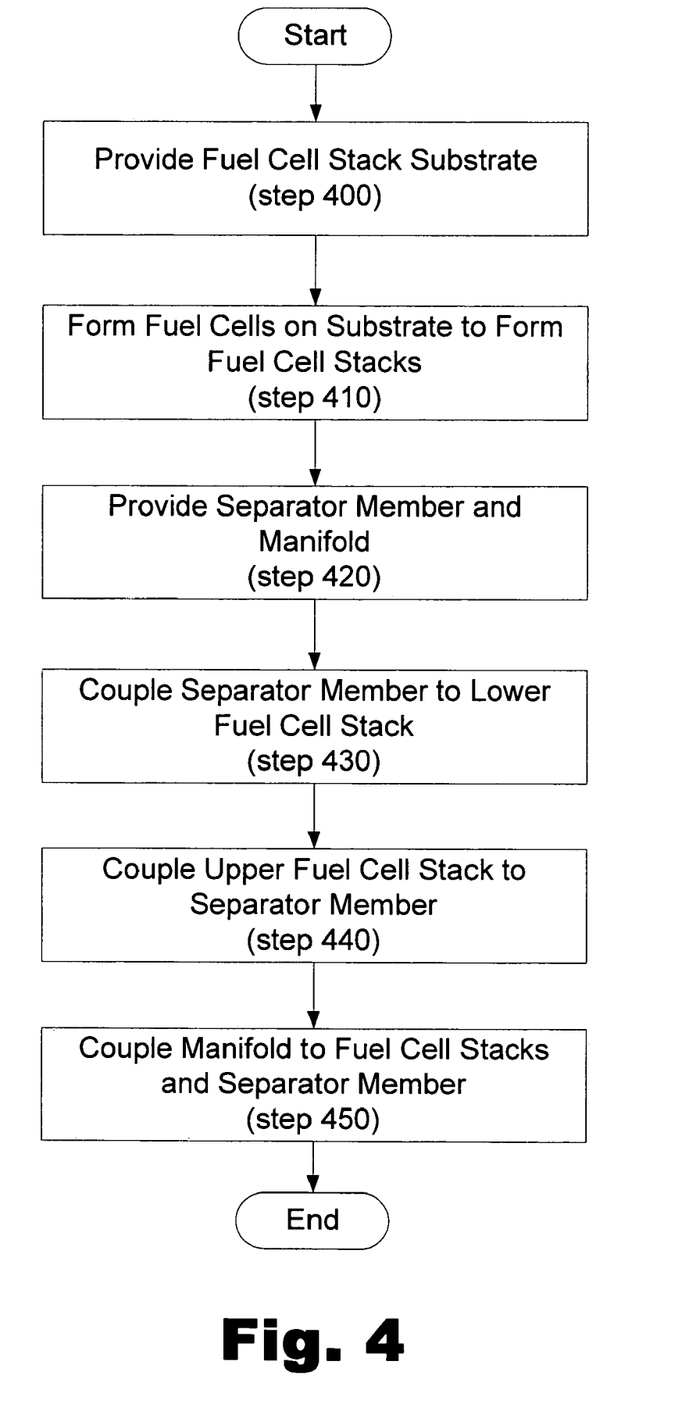
FIG. 4 is a flowchart illustrating the fabrication of a fuel cell stack assembly according to one exemplary embodiment.

FIG. 4 is a flowchart illustrating a method of fabricating the fuel cell stack assembly described above. The fabrication process begins by providing a fuel cell stack substrate (step 400). The fuel cell stack substrate provided may be, according to one exemplary embodiment, a porous ceramic substrate shaped into a flat porous plate for ease of manufacturing.

Once the fuel cell substrate has been provided, individual fuel cells are formed on the fuel cell stack substrate in order to form fuel cell stacks (410). The formation of each fuel cell includes the formation of an anode, an electrolyte, a cathode, and electrical interconnects. Accordingly, a plurality of individual fuel cells may be formed on a single substrate plate.

The anode, cathode, and electrical interconnects may be formed by any suitable process including, but in no way limited to, screen printing, spin-on deposition, colloidal spray deposition, doctor blade methods, etc. Similarly, the electrolyte may be formed by any suitable process, including, by way of example, sputter deposition.

The cathode may be any material capable of catalytically reducing gaseous oxygen, thereby creating oxygen ions including, but in no way limited to, a mixed conducting perovskite such as lanthanum manganite ($LaMnO_3$). The anode may be any material capable of catalytically oxidizing fuel species, such as hydrogen. The materials used to form the anode may include, but are in no way limited to, a ceramic/metal composite such as an electronically conducting nickel/yttria-stabilized zirconia cermet. The electrolyte may be any oxygen ion conducting electrolyte including, but in no way limited to, zirconia-based electrolytes such as yttria-stabilized zirconia, gadolinium-doped ceria, or a (strontium, magnesium)-doped $LaGaO_3$ (LSGM).

Once the fuel cells have been formed (step 410), a fuel manifold and spacing member are provided (step 420). The spacing member may be made of a ceramic or metallic material with a coefficient of thermal expansion similar to or equal to that of the fuel cell substrate. The fuel manifold may be made of a metallic material or any other suitable material, preferably with the same coefficient of thermal expansion as the ceramic substrate.

The lower fuel cell stack is then sealingly coupled to the spacing member (step 430), after which an upper fuel cell stack is also sealingly coupled to the spacing member (step 440). After both the lower fuel cell stack and the upper fuel cell stack have been sealingly coupled to the spacing member, the fuel manifold is also sealingly coupled to the spacing member as well as to the upper and lower fuel cell stacks (step 450). As described, the fuel manifold extends through the spacing member to provide fuel to the interior of the assembly, i.e., both the upper and the lower fuel cell stacks.

Accordingly, the present method enables the use of low cost, high volume ceramic manufacturing techniques to form a fuel cell stack assembly. Furthermore, a fuel manifold that is coupled to the fuel cell stacks at only one end minimizes the seal length between dissimilar materials such as the metallic materials of the manifold and the ceramic material of the fuel cell stacks and/or spacing member. This configuration reduces the stresses induced due to differences in the coefficients of thermal expansion of the two materials during the normal temperature cycling of an operating fuel cell.

The present configuration allows of the fuel cell stack assembly to expand or contract unconstrained. This freedom of expansion leads to less cracking of the brittle fuel cells or their seals thereby improving the longevity of the fuel cell stack assembly, which in turn allows for the use of a higher number of fuel cells. This ability to incorporate a higher number of fuel cells increases volumetric power density of the system. In addition, the fuel cell stack assemblies may be further grouped together, thereby further increasing volumetric power density.

Alternative Embodiments

Figure 5:
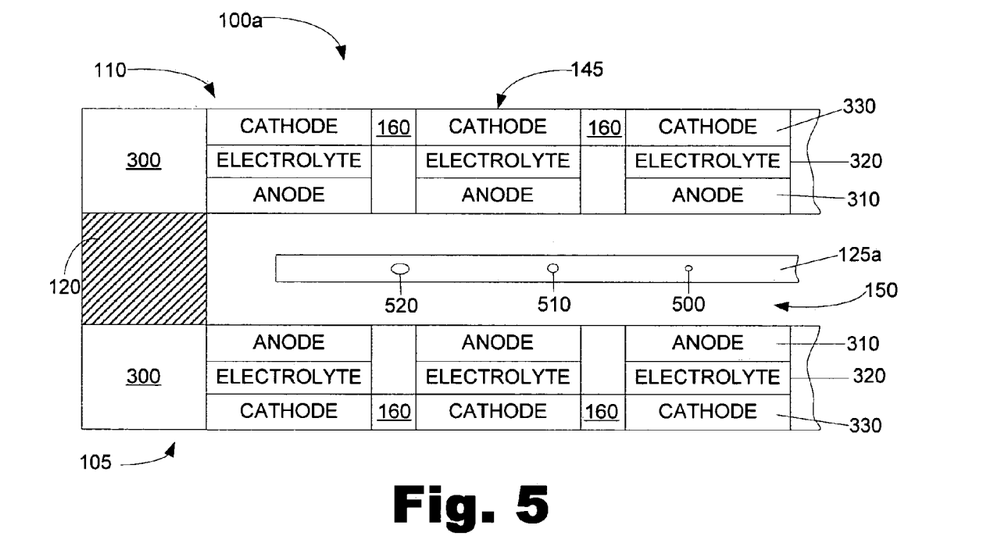
FIG. 5 illustrates a partial cross-sectional view of a fuel cell stack assembly with a gradient pressure fuel needle according to one exemplary embodiment.

FIG. 5 illustrates an exemplary fuel cell stack assembly (100a) with a gradient-opening fuel needle (125a). The gradient-opening fuel needle (125a) has at least two differently sized exhaust holes or openings for releasing fuel into the fluidic cavity (150). In the illustrated embodiment of FIG. 5, the needle (125a) includes a plurality of openings that vary in size from a small opening (500), including an intermediate opening (510), to a larger opening (520).

As fuel is released along the length of the needle (125a), the pressure of fuel in the fuel needle (125a) decreases as the fuel approaches the end of the fuel needle (125a) furthest from the fuel manifold. As shown in FIG. 5, the small opening (500) is located near the manifold at a higher-pressure portion of the fuel needle (125a), i.e., where the fuel in the needle is under a relatively high pressure. The larger opening is located at a lower pressure portion of the fuel needle away from the manifold where the fuel in the needle is under a relatively low pressure.

Where the pressure of the fuel in the needle is high, the high pressure will tend to cause the release of a relatively large amount of fuel. However, the smaller size of the opening (500) at the high-pressure portion of the needle (125a) will limit the amount of fuel released. In contrast, where the pressure of the fuel is low, the low pressure will not tend to expel as much fuel as would be the case under a higher fuel pressure. Consequently, the larger size opening (520) is positioned at the low-pressure portion of the needle (125a) to promote the release of additional fuel, compensating for the low pressure.

Accordingly, the configuration illustrated in FIG. 5 facilitates delivery of a roughly uniform amount of fuel along the length of the needle (125a) and the fuel cell stack assembly (100) by inversely relating the size of the exhaust openings to the pressure of the fuel at that portion of the fuel needle (125a). Uniform fuel delivery allows for more even power production among the individual fuel cells, which in turn leads to improved performance of the fuel cell system. While three openings are shown in the illustrated implementation, any number of openings with any graduation of sizes to accommodate pressure changes may be defined in the fuel needle (125a).

Figure 6:
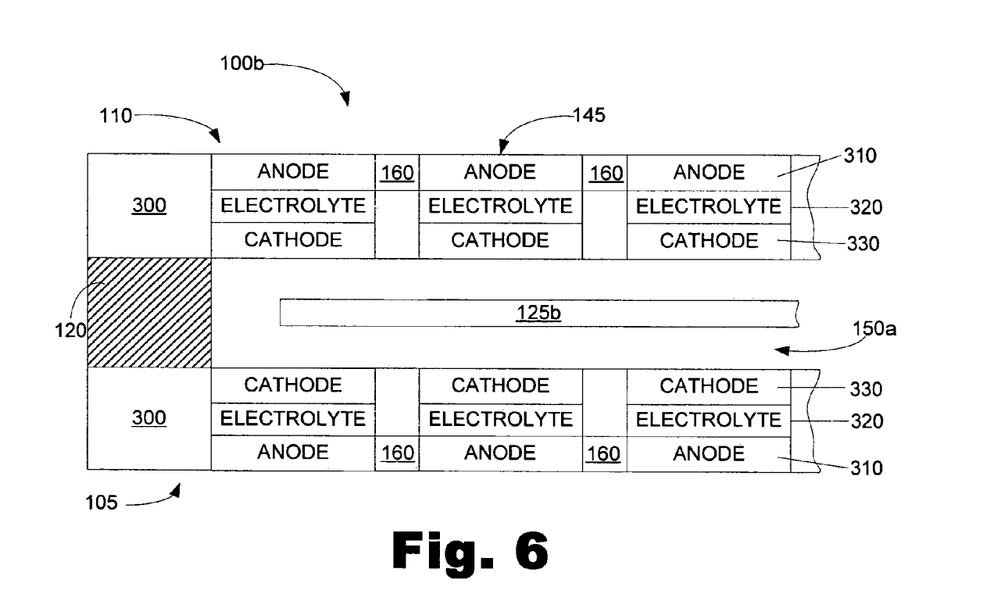
FIG. 6 illustrates a partial cross section of a fuel cell stack assembly according to exemplary embodiment.

FIG. 6 illustrates yet another fuel cell stack assembly (600). As shown in FIG. 6, the fuel cell stack may include a fluidic cavity (150a) in which oxygen or another oxidant is introduced by a fluid manifold (115; FIG. 1). The components of the fuel cell stack assembly (600) shown in FIG. 6 are similar to those described above with the exception that the manifold provides an oxidant rather than a fuel. Consequently, the cathodes (330) of the individual fuel cells (145) disposed in the stacks (105, 110) are placed in communication with the fluidic cavity (150a). In previously described embodiments, the anodes (310) of the fuel cells were placed in communication with the fluidic cavity (e.g., FIGS. 3 and 5).

According to FIG. 6, the oxidant is conveyed to the fluidic cavity (150a) through the fluid manifold and is distributed throughout the fluidic cavity (150a) by a fluid needle (125b), which is connected to the fluid manifold. The fluid needle (125b) may be designed to operate in the same way as the fuel needle (125) described above.

In order to operate the configuration illustrated in FIG. 6, the fuel cell stack assembly (600) will be placed in a fuel atmosphere where the anode (310) may readily react with the fuel. In contrast to the previous figures, FIG. 6 illustrates a configuration in which the cathodes (330) of each of the fuel cells (145) are adjacent to the fluidic cavity. As the oxidant is supplied to the fluidic cavity (150a), the cathodes catalytically reduce the supplied oxidant and produce oxygen ions that are then transported to the electrolyte (320) to fuel a reaction similar to that explained above thereby producing useable electricity.

The implementation illustrated in FIG. 6 demonstrates that the fluidic cavity (150a) may act as either an oxidant chamber or as a fuel chamber for a plurality of fuel cell stacks. Accordingly, the fuel cell stack assembly (100b) may be adapted to meet a variety of needs.

Figure 7:
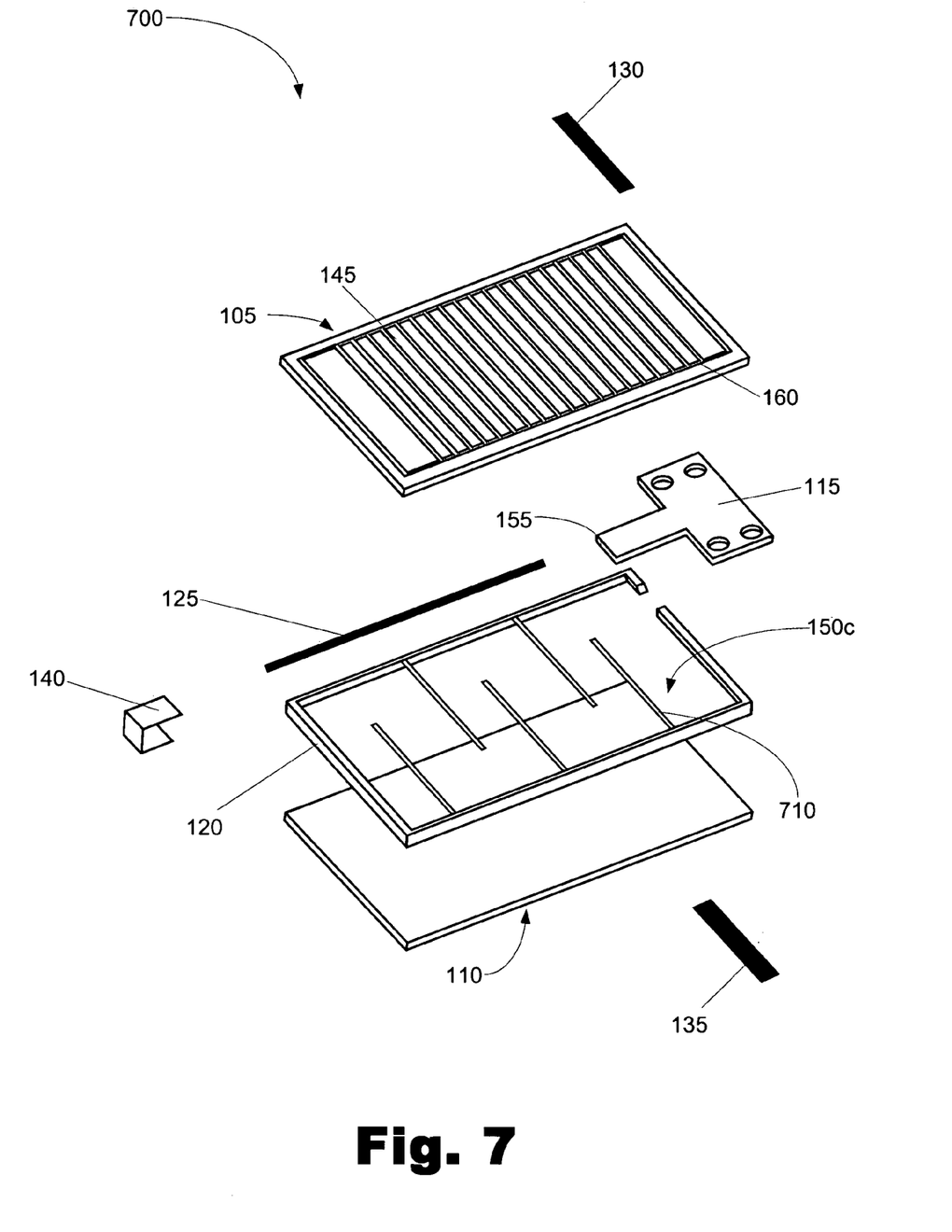
FIG. 7 illustrates an exploded view of a fuel cell stack assembly according to one alternative embodiment.

FIG. 7 illustrates another fuel cell stack assembly (700) wherein flow field modification features are included in the fluidic cavity (150c) to improve the fuel distribution uniformity and utilization within the stack assembly (700). While the flow field modification features (710) could take the form of any number of different geometries, FIG. 7 illustrates a serpentine fuel flow path from the introduction points of the fuel on the needle (125) to the exhaust holes (155).

The preceding description has been presented only to illustrate and describe the present method and apparatus. It is not intended to be exhaustive or to limit the invention to any precise form disclosed. Many modifications and variations are possible in light of the above teaching. It is intended that the scope of the invention be defined by the following claims.

What is claimed is:

1. A fuel cell stack assembly, comprising:
   opposing fuel cell stacks, said fuel cell stacks having a plurality of fuel cells, wherein
   said fuel cells include an anode, a cathode, and an electrolyte; and
   a spacing member disposed between said opposing fuel cell stacks thereby defining a sealed fluidic cavity.

2. The fuel cell stack assembly of claim 1, further comprising a manifold fluidly coupled to said sealed fluidic cavity.

3. The fuel cell stack assembly of claim 2, further comprising:
   a fluid delivery needle coupled to said manifold;
   said fluid delivery needle extending into said fluidic cavity.

4. The fuel cell stack assembly of claim 3, wherein said fluid delivery needle, comprises:
   a plurality of gradient boles disposed on said fluid delivery needle;
   said gradient holes varying from a smaller size at a proximal end of said fluid delivery needle and increasing in size toward a distal end of said fluid delivery needle.

5. The fuel cell stack assembly of claim 2, wherein said manifold comprises:
   a fuel manifold, said fuel manifold incorporating an exhaust port to remove excess fuel and waste products; and
   a fuel needle coupled to said fuel manifold.

6. The fuel cell stack assembly of claim 2, wherein said manifold comprises an exhaust, said spacing member preventing the release of a reactant from said sealed cavity other than trough said exhaust.

7. The fuel cell stack assembly of claim 2, wherein said opposing fuel cell stacks are cantilevered from said manifold.

8. The fuel cell stack assembly of claim 2, wherein said manifold comprises a fluid delivery needle extending from said manifold into said fluidic cavity said fluid delivery needle having a gradient of differently-sized boles along a length thereof, said holes varying from a smaller size at a proximal end of said fluid delivery needle and increasing in size toward a distal end of said fluid delivery needle.

9. The fuel cell stack assembly of claim 1, wherein said sealed fluidic cavity comprises a fuel cavity.

10. The fuel cell stack assembly of claim 1, wherein said opposing fuel cell stacks comprise a ceramic material.

11. The fuel cell stack assembly of claim 10, wherein said ceramic material comprises a porous ceramic material.

12. The fuel cell stack assembly of claim 10, wherein said spacing member comprises a ceramic material.

13. The fuel cell stack assembly of claim 1, wherein said spacing member and said fuel cell stacks comprise materials having matched coefficients of thermal expansion.

14. The fuel cell stack assembly of claim 1, further comprising a plurality of electrical interconnects electrically coupling said plurality of fuel cells.

15. The fuel cell stack assembly of claim 14, wherein said electrical interconnects comprise internal electrical interconnects.

16. The fuel cell stack assembly of claim 14, further comprising a plurality of electrodes coupled to said electrical interconnects.

17. The fuel cell stack assembly of claim 1, wherein said cathodes of each of said fuel cells are adjacent to said fluidic cavity.

18. The fuel cell stack assembly of claim 1, wherein said anodes of each of said fuel cells are each adjacent said fluidic cavity.

19. The fuel cell stack assembly of claim 1, wherein said fuel cells are connected in series.

20. The fuel cell stack assembly of claim 1, wherein fuel cell stacks comprise an integrated planar array of said fuel cells.

21. The fuel cell stack assembly of claim 1, wherein said fluidic cavity further comprises flow field modification features.

22. The fuel cell stack assembly of claim 21, wherein said flow field modification features comprise a serpentine path.

23. The fuel cell stack assembly of claim 1, further comprising a fuel manifold coupled to a first end of said assembly, whereby said fuel cell stack cantilevers from said manifold.

24. An electrochemical apparatus, comprising:
   at least one fuel cell stack assembly, having:

opposing fuel cell stacks, said fuel cell stacks having a plurality of fuel cells, wherein said fuel cells include an anode, a cathode, and an electrolyte;

a plurality of electrical interconnects coupled to said fuel cell stacks;

a spacing member disposed between said fuel cell stacks thereby defining a fluidic cavity; and a manifold fluidly coupled to said fluidic cavity with a fluid delivery needle extending from said manifold into said fluidic cavity said fluid delivery needle having a gradient of differently-sized holes along a length thereof said boles varying from a smaller size at a proximal end of said fluid delivery needle and increasing in size toward a distal end of said fluid delivery needle.

25. The electrochemical apparatus of claim 24, further comprising:

a plurality of opposing fuel cell stack pairs;

a spacing member disposed between each pair of fuel cell stacks; and a fluidic cavity defined between each pair of fuel cell stacks.

26. The electrochemical apparatus of claim 24, wherein said manifold comprises a fuel manifold and said fluid delivery needle comprises a fuel needle.

27. The electrochemical apparatus of claim 24, wherein said fluidic cavity comprises a fuel cavity.

28. The electrochemical apparatus of claim 24, wherein said fuel cell stacks comprise a ceramic material.

29. The electrochemical apparatus of claim 28, wherein said ceramic material comprises a porous ceramic material.

30. The electrochemical apparatus of claim 28, wherein said spacing member comprises a ceramic material.

31. The electrochemical apparatus of claim 30, wherein said spacing member and said fuel cell stacks comprise materials having matched coefficients of thermal expansion.

32. The electrochemical apparatus of claim 24, wherein said electrical interconnects comprise internal electrical interconnects.

33. The electrochemical apparatus of claim 24, further comprising a fuel source coupled to said manifold.

34. The electrochemical apparatus of claim 24, wherein said cathodes of said fuel cells arc adjacent said fluidic cavity.

35. The electrochemical apparatus of claim 24, wherein said anodes of said fuel cells are adjacent to said fluidic cavity.

36. The electrochemical apparatus of claim 24, further comprising a plurality of said fuel cell stack assemblies.

37. A fuel cell system, comprising:

a plurality of fuel cell stacks;

means for supporting said fuel cell stacks, wherein said fuel cell stacks are coupled to and cantilevered from a manifold;

means for separating said fuel cell stacks and sealingly establishing a fluidic cavity between said fuel cell stacks; and means for providing a fluid to said fluidic cavity.

38. The fuel cell system of claim 37, wherein said fluid comprises a fuel.

39. The fuel cell system of claim 37, further comprising means for supplying an oxidant to an exterior of said fuel cell stacks.

40. The fuel cell system of claim 37, further comprising means for withdrawing an electrical current from said system.

41. The fuel cell system of claim 40, further comprising means for supplying said electrical current to an electronic device.

42. The fuel cell system of claim 37, wherein said means for providing a fluid to said fluidic cavity further comprises means for providing a substantially constant quantity of said fluid along a length of said means for providing a fluid.

43. The fuel cell system of claim 42, wherein said means for providing a substantially constant quantity of fluid comprises a plurality of gradient boles disposed in said means for providing a fluid.

44. The fuel cell system of claim 37, further comprising means for modifying a flow field of said fluid within said fluidic cavity.

45. The fuel cell system of claim 44, wherein said means for modifying a flow field of said fluid within said fluidic cavity comprises a serpentine fuel flow path.

* * * * *

UNITED STATES PATENT AND TRADEMARK OFFICE
CERTIFICATE OF CORRECTION

PATENT NO. : 7,160,642 B2 Page 1 of 1
APPLICATION NO. : 10/699395
DATED : January 9, 2007
INVENTOR(S) : Gary D Tarver et al.

It is certified that error appears in the above-identified patent and that said Letters Patent is hereby corrected as shown below:

In column 7, line 65, in Claim 4, delete "needle," and insert -- needle --, therefor.

In column 7, line 66, in Claim 4, delete "boles" and insert -- holes --, therefor.

In column 8, line 14, in Claim 6, delete "trough" and insert -- through --, therefor.

In column 8, line 21, in Claim 8, delete "boles" and insert -- holes --, therefor.

In column 9, line 12, in Claim 24, delete "thereof said boles" and
insert -- thereof, said holes --, therefor.

In column 9, line 43, in Claim 34, delete "arc" and insert -- are --, therefor.

In column 10, line 35, in Claim 43, delete "boles" and insert -- holes --, therefor.

Signed and Sealed this

Twenty-ninth Day of September, 2009

David J. Kappos
*Director of the United States Patent and Trademark Office*